United States Patent [19]

Zhicheng et al.

[11] Patent Number: 5,380,690
[45] Date of Patent: Jan. 10, 1995

[54] CRACKING CATALYST FOR THE PRODUCTION OF LIGHT OLEFINS

[75] Inventors: Shi Zhicheng; Shi Wenyuan; Ye Yifang; Ge Xingpin; Cao Ping; Liu Shunhua; Xie Chaogang; Li Zaiting; Shu Xingtian; Yang Xiaoming; Fu Wei; Zhou Meng; He Mingyuan, all of Beijing, China

[73] Assignee: China Petro-Chemical Corporation, Beijing, China

[21] Appl. No.: 72,771

[22] Filed: Jun. 7, 1993

[30] Foreign Application Priority Data

Mar. 29, 1993 [CN] China .................. 93102783.7

[51] Int. Cl.$^6$ .................. B01J 29/08; B01J 29/28
[52] U.S. Cl. .................. 502/65; 502/67; 502/68
[58] Field of Search .................. 208/114; 502/67, 65, 502/68

[56] References Cited

U.S. PATENT DOCUMENTS

| | | | |
|---|---|---|---|
| 3,443,892 | 5/1969 | Wacks et al. | 23/113 |
| 3,541,179 | 11/1970 | Odagami et al. | 260/683 |
| 3,647,682 | 3/1972 | Rabo et al. | 208/120 |
| 3,702,886 | 11/1972 | Argauer et al. | 423/328 |
| 3,725,485 | 4/1973 | Martini | 260/612 |
| 3,758,403 | 9/1973 | Rosinski et al. | 208/120 |
| 3,839,485 | 10/1974 | Wrisberg et al. | 260/683 |
| 4,044,065 | 8/1977 | Butter et al. | 260/677 |
| 4,087,350 | 5/1978 | Kolombos et al. | 208/121 |
| 4,111,793 | 9/1978 | Kolombos et al. | 208/121 |
| 4,171,257 | 10/1979 | O'Rear et al. | 208/120 |
| 4,172,816 | 10/1979 | Pop et al. | 208/120 |
| 4,172,856 | 10/1979 | Spencer et al. | 585/640 |
| 4,175,114 | 11/1979 | Plank et al. | 423/329 |
| 4,238,367 | 12/1980 | Bertis et al. | 252/455 |
| 4,242,237 | 12/1980 | Gladrow et al. | 252/455 |
| 4,243,556 | 1/1981 | Blanton, Jr. | 252/455 |
| 4,251,348 | 2/1981 | O'Rear et al. | 208/61 |
| 4,274,982 | 6/1981 | Chu | 252/455 |
| 4,282,085 | 8/1981 | O'Rear et al. | 208/120 |
| 4,309,280 | 1/1982 | Rosinski et al. | 208/120 |
| 4,340,465 | 7/1982 | Miller et al. | 208/120 |
| 4,374,294 | 2/1983 | Chu | 585/466 |
| 4,391,739 | 7/1983 | Chu | 252/455 |
| 4,399,059 | 8/1983 | Chu | 252/455 |
| 4,401,555 | 8/1983 | Miller | 208/111 |
| 4,416,766 | 11/1983 | Mulaskey | 208/135 |
| 4,440,868 | 4/1984 | Hettinger, Jr. et al. | 502/65 |
| 4,440,871 | 4/1984 | Lok et al. | 502/214 |
| 4,452,907 | 6/1984 | Ball et al. | 502/60 |
| 4,483,764 | 11/1984 | Hensley, Jr. et al. | 208/111 |
| 4,504,382 | 3/1985 | Pine | 208/114 |
| 4,578,371 | 3/1986 | Rieck et al. | 502/71 |
| 4,605,637 | 8/1986 | Chang et al. | 502/64 |
| 4,654,138 | 3/1987 | Derouane et al. | 208/114 |
| 4,658,081 | 4/1987 | Kolts | 585/651 |
| 4,692,236 | 9/1987 | Sato et al. | 208/114 |
| 4,757,040 | 7/1988 | Guan et al. | 502/63 |
| 4,826,804 | 5/1989 | Shamshoum | 502/214 |
| 4,837,000 | 6/1989 | Talatsi et al. | 423/328 |

(List continued on next page.)

FOREIGN PATENT DOCUMENTS

| | | |
|---|---|---|
| 1031834 | 8/1987 | China . |
| 1043520 | 12/1988 | China . |
| 0372632 | 6/1990 | European Pat. Off. . |
| 152356 | 11/1981 | German Dem. Rep. . |
| 225135 | 7/1985 | German Dem. Rep. . |
| 60-222428 | 11/1985 | Japan . |

(List continued on next page.)

Primary Examiner—Carl F. Dees
Attorney, Agent, or Firm—Hedman, Gibson & Costigan

[57] ABSTRACT

A cracking catalyst for the production of light olefins comprises 0–70% (based on the weight of the catalyst) of clay, 5–99% of inorganic oxides, and 1–50% of zeolite. The zeolite in the catalyst is a mixture of 0–25 wt % of REY or high silica Y zeolite and 75–100 wt % of phosphorus and rare earth containing high silica zeolite having a structure of pentasil. The catalyst exhibits higher hydrothermal activity-stability, conversion level, and $C_2$–$C_4$ olefin yields in cracking reaction, comparing with the catalyst using HZSM-5 zeolite as active component.

9 Claims, No Drawings

U.S. PATENT DOCUMENTS

| | | | |
|---|---|---|---|
| 4,839,319 | 6/1989 | Schuette et al. | 502/64 |
| 4,913,796 | 4/1990 | Valyocsik | 208/46 |
| 4,943,424 | 7/1990 | Miller | 423/328 |
| 4,970,183 | 11/1990 | Nakamoto et al. | 502/68 |
| 4,977,122 | 12/1990 | Eberly | 502/69 |
| 4,980,053 | 12/1990 | Li et al. | 208/120 |
| 5,023,066 | 6/1991 | Gimpel et al. | 423/328 |
| 5,023,220 | 6/1991 | Dight et al. | 502/65 |
| 5,026,935 | 6/1991 | Leyshon et al. | 585/315 |
| 5,026,936 | 6/1991 | Leyshon et al. | 585/315 |
| 5,026,943 | 6/1991 | Rubin et al. | 585/467 |
| 5,043,522 | 8/1991 | Leyshon et al. | 585/651 |
| 5,059,735 | 10/1991 | Nemet-Mavrodin | 585/418 |
| 5,069,776 | 12/1991 | Biswas et al. | 208/120 |
| 5,077,253 | 12/1991 | Chu et al. | 502/67 |
| 5,079,202 | 1/1992 | Kumar et al. | 502/68 |
| 5,095,166 | 3/1992 | Forschner et al. | 585/653 |
| 5,098,684 | 3/1992 | Kresge et al. | 423/277 |
| 5,102,643 | 4/1992 | Kresge et al. | 423/328 |
| 5,107,042 | 4/1992 | Gaffney et al. | 585/651 |
| 5,110,776 | 5/1992 | Chitnis et al. | 208/114 |
| 5,149,421 | 9/1992 | Miller | 208/114 |
| 5,159,128 | 10/1992 | Forschner et al. | 585/653 |
| 5,171,921 | 12/1992 | Gaffney et al. | 585/653 |

FOREIGN PATENT DOCUMENTS

| | | |
|---|---|---|
| 1574840 | 10/1980 | United Kingdom . |
| 2084552 | 4/1982 | United Kingdom . |
| 410073 | 4/1974 | U.S.S.R. . |
| 487927 | 1/1976 | U.S.S.R. . |
| 523133 | 9/1976 | U.S.S.R. . |
| 550173 | 4/1977 | U.S.S.R. . |
| 559946 | 6/1977 | U.S.S.R. . |
| 1214726 | 11/1984 | U.S.S.R. . |

CRACKING CATALYST FOR THE PRODUCTION OF LIGHT OLEFINS

FIELD OF THE INVENTION

The present invention relates to a petroleum hydrocarbon cracking catalyst for producing light olefins, particularly, to a crystalline alumiosilicate based hydrocarbon cracking catalyst for producing ethylene, propylene, and butylenes, especially propylene and butylenes.

BACKGROUND OF THE INVENTION

The light olefins are important raw materials for petrochemicals. Their general production methods include natural gas steam cracking, naphtha or light cycle oil thermal cracking in a tubular furnace, heavier hydrocarbon thermal cracking on solid heat carrier, and catalytic conversion of light alcohol's. The conventional catalytic crackers also produce light olefins as by-products with a yield lower than 15 wt % of the charge during the production of gasoline and light cycle oil.

A survey of the literature shows that there are approximately three types of catalysts used for producing light olefins by cracking petroleum hydrocarbons. The first type catalyst is oxides supported metal catalysts, wherein the support can be $SiO_2$, $Al_2O_3$, or other oxides and the metal components are mainly selected from elements of IIB, VB, VIIB, and VIII groups, as disclosed in U.S. Pat. No. 3,541,179; 3,647,682; DD 225,135; and SU 1,214,726. As the supported metal possesses dehydrogenation ability, it also accerelates the condensing and coking reaction during the reaction process of cracking. Hence, this type catalysts can only be used for processing light feed stocks (<220° C.).

The second type catalyst is oxide composites, such as a composite comprising mainly $ZrO_2$ and/or $HfO_2$ and also $Al_2O_3$, $Cr_2O_3$, MnO and/or $Fe_2O_3$ and alkali or alkaline metal oxides, as disclosed in U.S. Pat. No. 3,725,495 and 3,839,485. In another example, the potassium vanadate, potassium stannate, or potassium niobate was used as catalyst for cracking gasoline to obtain approximately 56 wt % of light olefins including 36.5 wt % of ethylene and 12.5 wt % of propylene, as disclosed in SU 523,133; 487,927 and 410,073. In further examples, the $SiO_2.Al_2O_3$ catalysts containing minor content of $Fe_2O_3$, $TiO_2$, CaO, MgO, $Na_2O$, or $K_2O$ were also used in cracking various hydrocarbon fractions, as disclosed in SU 550,173; 559,946. The rather commonly used oxide composite was amorphous $SiO_2$-$Al_2O_3$, as used in DD 152,356 as a catalyst for cracking various liquid hydrocarbon or hydrocarbon fractions (including gasoline, kerosene, gas oil, or vacuum distillates) at 600°–800° C. to produce light olefin with a $C_2$–$C_4$ olefin yield of 40–55 wt %.

Along with the extensive application of zeolites in petrochemical and petroleum refining industry, the third type catalyst, i.e., zeolite-containing catalysts especially ZSM-5 zeolite-containing catalysts, were reported in a large number of literature. This type catalyst can be solely used or used as an additive in catalytic crackers or incorporated in cracking catalysts. JP 60-224,428 disclosed a cracking catalyst using ZSM-5 zeolite as active component and alumina as matrix, which was used at 600°–750° C. to crack a feed stock of $C_5$–$C_{25}$ paraffinic hydrocarbons with a $C_2$–$C_4$ olefin yield of roughly 30%. In U.S. Pat. No. 4,309,280, HZSM-5 zeolite was added directly into the catalytic cracker by a weight percent of 0.01–1 based on the weight of the catalyst. In U.S. Pat. No. 3,758,403, a catalyst comprising both ZSM-5 zeolite and a large pore zeolite (e.g. X type or Y type) as active components with a ratio of 1:10–3:1 displayed a performance in simultaneously enhancing gasoline octane number and increasing $C_3$–$C_4$ olefin yield to about 10 wt %. The present applicants also disclosed in CN 1004878B, U.S. Pat. No. 4,908,053, and CN 1043520A, catalysts using mixed ZSM-5 zeolite and Y zeolite as active components, which exhibited performance in simultaneously enhancing gasoline octane and $C_2$–$C_4$ olefin especially $C_3$–$C_4$ olefin yield at 500°–650° C.

The object of the present invention is to provide a novel zeolite-containing catalyst possessing higher hydrothermal stability, conversion ability and $C_2$–$C_4$ olefin yield during cracking reaction.

The other objects of the present invention can be learned from the content of the specification of the present invention including the claims.

SUMMARY Of THE INVENTION

The present invention provides a catalyst comprising 0–70% (based on the weight of the catalyst) of clay, 5–99% of inorganic oxides, and 1–50% of zeolite, wherein said zeolite is a mixture of 0–25 wt % of Y zeolite and 75–100 wt % of phosphorus and rare earth containing high silica zeolite having a structure of pentasil.

Said phosphorus and rare earth containing high silica zeolite having a structure of pentasil in the catalyst of the invention, is a rare earth containing high silica zeolite having a structure of pentasil, modified by aluminium phosphate, with a phosphorus content of 2–20 wt % (calculated as $P_2O_5$), preferably 2–10 wt %, and a rare earth content of 2–10 wt % (calculated as $RE_2O_3$).

Said rare earth containing high silica zeolite having a structure of pentasil (commercial name ZRP) possesses an X-ray diffraction pattern of ZSM-5 zeolite family and an anhydrous chemical composition formula: 0.01–0.30 $RE_2O_3.0.4$–$1.0$ $Na_2O.Al_2O_3.20$–$60$ $SiO_2$, in which, the rare earth comes from rare earth containing faujasite seeds used for the synthesis of ZRP zeolite. ZRP zeolite is characterised in its narrower pore opening than that of ZSM-5 zeolite, with a 2–4 times higher adsorption capacity ratio of normal hexane to cyclohexane adsorption than that of ZSM-5 zeolite.

DETAILED DESCRIPTION OF THE INVENTION

The present invention provides a catalyst comprising 0–70% (based on the weight of the catalyst) of clay, 5–99% of inorganic oxides, and 1–50% of zeolite, said zeolite is a mixture of 0–25 wt % of Y zeolite and 75–100 wt % of phosphorus and rare earth containing high silica zeolite having a structure of pentasil.

Said clay in the catalyst of the invention can be all kind of clays usually used as a component of cracking catalysts, either natural or synthesised clays, such as kaolin and halloysite, may or may not be subjected to various chemical and/or physical treatment.

Said inorganic oxides in the catalyst of the invention are selected from amorphous $SiO_2.Al_2O_3$, $Al_2O_3$ and/or $SiO_2$.

Said Y zeolite in the catalyst of the invention may be a rare earth exchanged Y (REY) zeolite with a rare earth of content not less than 14 wt % (calculated as $RE_2O_3$) prepared by conventional exchange method, may also be a stabilised high silica Y zeolite with a high silica/alumina ratio, prepared by various chemical and/or physical method, such as hydrothermal method, acid treatment method, framework silicon enriching method, or $SiCl_4$ treatment method.

Said phosphorus and rare earth containing high silica zeolite having a structure of pentasil in the catalyst of the invention, is a rare earth containing high silica zeolite having a structure of pentasil, modified by aluminium phosphate, with a phosphorus content of 2–20 wt % (calculated as $P_2O_5$), preferably 2–10 wt %, and a rare earth content of 2–10 wt % (calculated as $RE_2O_3$).

Said rare earth containing high silica zeolite having a structure of pentasil (commercial name ZRP) possesses a X-ray diffraction pattern of ZSM-5 zeolite family and an anhydrous chemical composition formula: $0.01-0.30\ RE_2O_3.0.4-1.0\ Na_2O.Al_2O_3.20-60\ SiO_2$, in which, the rare earth comes from rare earth containing faujasite seeds used for the synthesis of ZRP zeolite. ZRP zeolite is characterised in its narrower pore opening than that of ZSM-5 zeolite, with a 2–4 times higher adsorption capacity ratio of normal hexane to cyclohexane adsorption than that of ZSM-5 zeolite. It was prepared according to the method disclosed in CN 1058382A, U.S. application Ser. No. 07/820,385, (U.S. Pat. No. 5,232,675) or Europe Appl. ser. no. 92200061.7, using water glass, aluminium phosphate, and inorganic acid as raw materials, and REY or REHY zeolite as crystalline seeds, and was crystallised at 130°–200° C. for 12–60 hrs.

Said ZRP zeolite was modified by aluminium phosphate as follows: the zeolite was pre-exchanged with ammonium ion to decrease its sodium content to a level of not more than 0.1 wt % (calculated as $Na_2O$), then mixed homogeneously with a aluminium phosphate sol having a composition of $Al_2O_3:P_2O_5=1:1-3$ according to a weight ratio of $P_2O_5$:zeolite (anhydrous basis)=1:5-99, followed by calcining at 300°–600° C. for 0.5–6 hrs in the presence of 10–100% steam.

The preparation method of the catalyst of the present invention is as follows: mixing the precursor of the inorganic oxides such as aluminium sol, pseudo-boehmite, silica sol or its mixture, and silica-alumina sol or gel with clay, according to a predetermined ratio, peptising with de-cationized water to prepare a slurry with a solid content of 10–50 wt %, further mixing homogeneously, adjusting and maintaining the pH value of the slurry to 2–4 using inorganic acid such as hydrochloric acid, nitric acid, phosphoric acid, or sulphuric acid, after ageing statically at 20°–80° C. for 0–2 hrs, adding into it a pre-calculated amount of zeolite, homogenising, spray drying, washing-off isolated sodium ions, and drying.

The catalyst of the present invention is characterised in that it has higher hydrothermal stability, higher conversion level, higher heavy oil conversion ability, and higher $C_2$–$C_4$ olefin yield than those of the catalyst using HZSM-5 zeolite as active component in catalytic cracking reaction. For example, when the cracking performance of the catalysts were evaluated in a micro reactor using a straight run diesel as feed under a reaction condition of: 520° C., catalyst/oil ratio 3.2 and WHSV 16 $h^1$, after pre-treated at 800° C. for 4 hrs in the presence of 100% steam, the catalyst of the invention displayed a higher activity retention (%) than the catalyst using HZSM-5 zeolite as active component by 7–25%. The difference remained in a range of 8–14% even if both catalysts were treated at 800° C. for 17 hrs in the presence of 100% steam. When the cracking performance of the catalysts were evaluated in a bench scale fixed-fluidized bed reactor using intermediate base vacuum gas oil (VGO) as feed under a reaction condition of: 580° C., catalyst/oil ratio 5, WHSV 1 $h^1$, the catalyst of the invention exhibited higher conversion level, higher heavy oil conversion, and higher $C_2$–$C_4$ olefin yield than those of the catalyst using HZSM-5 zeolite as active component by 4–7%, 3.5–8%, and 4–5%, respectively.

The present invention will be further described with reference to the following examples. However, these examples are not to be construed to limit the scope of the present invention.

The preparation of the phosphorus and rare earth containing high silica zeolite having a structure of pentasil (designated as P-ZRP hereinafter) used in the examples is as follows: 100 g (anhydrous basis) ZRP zeolite (commercial product, silica/alumina ratio of 30, rare earth oxide content of 2.0 wt %) was ion-exchanged at 90° C. for 1 hr according to a weight ratio of: zeolite (anhydrous basis):ammonium sulphate:de-cationized water=100:25:2000. After filtering, the resultant was ion-exchanged once more. The sodium content of the zeolite measured by atomic absorption spectrometry was 0.04% (calculated as $Na_2O$). A homogeneously mixed mixture of 13.8 g pseudo-boehmite (a commercial product with a alumina content of 95% and a solid content of 30 wt %), 9.0 g industrial grade phosphoric acid (content of 85 wt %), and 200 g de-cationised water, was added to the above mentioned ammonium exchanged zeolite, followed by stirring homogeneously, drying at 110° C., and ageing at 800° C. for 4 hrs in the presence of 100% steam, to obtain the P-ZRP zeolite with a phosphorus content of 5% (calculated as $P_2O_5$).

The condition used for evaluating catalysts in a bench-scale fixed-fluidized bed reactor in the examples was: reaction temperature 580° C., catalyst/oil ratio 5, WHSV 1 $h^1$, and water injection 20%. The catalyst samples were pre-treated at 760° C. for 6 hrs in the presence of 100% steam. The catalyst loading was 180 g. The properties of the intermediate base VGO used as the feed for evaluation was as follows:

| | |
|---|---|
| density (20° C.), g/cm3 | 0.8808 |
| Conradson carbon, wt % | 0.26 |
| H/C (atomic ratio) | 1.79 |
| S | 0.33 |
| N | 0.14 |
| basic nitrogen, ppm | 537 |
| distillation range, °C. | 256–545 |
| K factor | 12.0 |

The reaction condition used for evaluating catalysts in a micro-reactor in the examples was: reaction temperature 520° C., catalyst/oil ratio 3.2, WHSV 16 $h^1$, feeding time length 70 sec. The catalyst samples were pre-treated at 800° C. for 4 hrs in the presence of 100% steam. The catalyst loading was 5.0 g. The properties of the straight run diesel oil used as feed were as follows:

| | |
|---|---|
| distillation range, °C. | 229–340 |
| paraffinic hydrocarbons, wt % | 45.5 |
| naphthenic hydrocarbons, wt % | 35.7 |
| aromatic hydrocarbons, wt % | 18.2 |

| | -continued | |
|---|---|---|
| gum, wt % | | 0.6 |

EXAMPLES 1–2

These examples related to the preparation and the cracking performance of the catalyst of the invention using P-ZRP zeolite as active component, clay as matrix, and aluminium sol as binder.

147 kg halloysite (a commercial product with a solid content of 80%) were added to 218 kg aluminium sol (a commercial product with a alumina content of 11.4% and a pH value of 2–3), stirring for 90 min, adding 36 kg (anhydrous basis) P-ZRP zeolite and 54 kg de-cationized water to the above mixture, homogenising and spray drying to obtain catalyst Sample A.

The same preparation procedure, except that 20 kg P-ZRP zeolite was used instead of 36 kg, was used to prepare catalyst Sample B.

Comparative Example 1

HZSM-5 zeolite (a commercial product with silica/alumina ratio not less than 55, crystallinity >85%, and $Na_2O$ <0.05 wt %) was used instead of P-ZRP zeolite to prepare Comparative Sample 1 according to the same procedure and same quantity used for the preparation of sample A.

Table 1 lists the chemical composition and physical properties of the above three samples. The evaluation results using fixed-fluidized bed reactor and micro-reactor are listed in Table 2 and 3 respectively.

The results in Table 2 show that: when P-ZRP zeolite and HZSM-5 zeolite were present in the catalysts in same content, the catalyst of the present invention displayed in reaction higher conversion level, higher heavy oil conversion, and higher $C_2$–$C_4$ olefin yield than those of the catalyst using HZSM-5 as active component by 7%, 8%, and 4.5% respectively. When the content of P-ZRP zeolite in the catalyst was decreased to 55% of the HZSM-5 content in the comparative catalyst, the heavy oil conversion and $C_2$–$C_4$ olefin yield were approximately same for both catalysts.

The results in Table 3 show a similar comparison.

TABLE 1

| Catalyst | Sample A | Sample B | Comparative Sample 1 |
|---|---|---|---|
| Composition, wt % | | | |
| clay | 57.4 | 63.0 | 57.4 |
| $Al_2O_3$ | 24.6 | 27.0 | 24.6 |
| zeolite | 18.0 | 10.0 | 18.0 |
| $Na_2O$ | 0.03 | 0.04 | 0.03 |
| $RE_2O_3$ | 0.36 | 0.20 | 0 |
| $P_2O_5$ | 0.9 | 0.5 | 0 |
| Surface area, $m^2/g$ | 93 | 78 | 90 |
| Pore volume, ml/g | 0.10 | 0.10 | 0.10 |

TABLE 2

| Catalyst | Sample A | Sample B | Comparative Sample 1 |
|---|---|---|---|
| Product yield, wt % | | | |
| cracking gas | 49.48 | 42.51 | 42.96 |
| wherein, | | | |
| $C_2$ olefin | 6.31 | 5.74 | 4.72 |
| $C_3$ olefin | 18.91 | 16.90 | 16.90 |
| $C_4$ olefin | 14.29 | 12.18 | 13.40 |
| gasoline ($C_5$-221° C.) | 21.09 | 20.85 | 19.44 |
| LCO (221–330° C.) | 8.29 | 7.99 | 7.12 |

TABLE 2-continued

| Catalyst | Sample A | Sample B | Comparative Sample 1 |
|---|---|---|---|
| heavy oil (>330° C.) | 16.10 | 25.35 | 23.98 |
| coke | 5.04 | 6.33 | 6.50 |
| Conversion, wt % | 75.61 | 67.75 | 68.91 |
| $C_2$–$C_4$ olefins, wt % | 39.51 | 34.82 | 35.02 |

TABLE 3

| Catalyst | Sample A | Sample B | Comparative Sample 1 |
|---|---|---|---|
| Activity, wt % | 44 | 40 | 35 |
| Gas yield, wt % | 19.65 | 15.39 | 14.10 |
| wherein, | | | |
| $C_2$ olefin | 1.42 | 0.89 | 0.84 |
| $C_3$ olefin | 8.05 | 6.55 | 6.09 |
| $C_4$ olefin | 6.29 | 5.34 | 4.91 |
| $C_2$–$C_4$ olefins, wt % | 15.76 | 12.78 | 11.84 |

EXAMPLE 3–4

These examples related to the preparation and the cracking performance of the catalyst of the invention using P-ZRP zeolite as active component, clay as matrix, and pseudo-boehmite as binder.

168 kg halloysite was slurried by 380 kg de-cationized water, then adding to it 174 kg pseudo-boehmite and 17 kg hydrochloric acid, stirring homogeneously, ageing statically at 75° C. for 1 hr, decreasing the temperature to a value lower than 60° C. while maintaining the pH value in the range of 2–4, adding to it 30 kg (anhydrous basis) P-ZRP zeolite and 50 kg de-cationized water, homogenising, spray drying, washing-off the isolated sodium ions, and drying, to obtain Catalyst Sample C.

The same preparation procedure was used to prepare Catalyst Sample D except that the P-ZRP zeolite containing 3% phosphorus was used for this preparation.

Comparative Example 2

H-ZSM-5 zeolite was used instead of P-ZRP zeolite to prepare Comparative Sample 2 using the same preparation method of Catalyst Sample C.

The composition and physical properties of the above three samples are listed in Table 4. The evaluation results of the above samples in the bench-scale fixed-fluidized reactor are listed in Table 5.

The results in Table 5 show that the total conversion level, heavy oil conversion, and $C_2$–$C_4$ olefin yield of the catalyst of the invention are higher than those of the catalyst using HZSM-5 zeolite as active component by 4–5.5%, 3.5–5%, and about 4%, respectively.

TABLE 4

| Catalyst | Sample C | Sample D | Comparative Sample 2 |
|---|---|---|---|
| Composition, wt % | | | |
| clay | 59.5 | 59.5 | 57.4 |
| $Al_2O_3$ | 25.5 | 25.5 | 24.6 |
| zeolite | 15.0 | 15.0 | 18.0 |
| $Na_2O$ | 0.03 | 0.03 | 0.03 |
| $Fe_2O_3$ | 0.36 | 0.38 | 0.55 |
| $RE_2O_3$ | 0.30 | 0.30 | 0 |
| $P_2O_5$ | 0.75 | 0.45 | 0 |
| Surface area, $m^2/g$ | 134 | 142 | 153 |
| Pore volume, ml/g | 0.18 | 0.19 | 0.22 |

TABLE 5

| Catalyst | Sample C | Sample D | Comparative Sample 2 |
|---|---|---|---|
| Product yield, wt % | | | |
| cracking gas | 51.02 | 49.31 | 43.81 |
| wherein, | | | |
| $C_2$ olefin | 6.16 | 5.47 | 4.36 |
| $C_3$ olefin | 19.74 | 18.92 | 16.70 |
| $C_4$ olefin | 13.71 | 13.76 | 12.52 |
| gasoline ($C_5$-221° C.) | 28.80 | 28.93 | 30.64 |
| LCO (221–330° C.) | 6.60 | 6.77 | 7.34 |
| heavy oil (>330° C.) | 7.22 | 8.76 | 11.99 |
| coke | 6.36 | 6.23 | 6.22 |
| Conversion, wt % | 86.18 | 84.47 | 80.67 |
| $C_2$–$C_4$ olefins, wt % | 39.61 | 38.15 | 35.58 |

EXAMPLE 5

It related to the preparation and the cracking performance of the catalyst of the invention using P-ZRP zeolite as active component, and amorphous silica-alumina as matrix.

373 liter water glass (a commercial product with a modules of 3.2±0.1 and a $SiO_2$ content of 124±2.0 g/l) was diluted by 398 kg de-cationized water, adding to it 97 liter aluminium sulphate (a commercial product) solution with a $Al_2O_3$ content of 50 g/l, stirring homogeneously, maintaining the temperature at 15°–25° C., then adding to it sequentially 136 liter aluminium sulphate solution with a $Al_2O_3$ content of 90 g/l and 95 liter ammonia water, further adding to it 36 kg (anhydrous basis) P-ZRP zeolite and 54 kg de-cationized water after stirring homogeneously, homogenising, spray drying, washing, and drying, to obtain Catalyst Sample E.

Comparative Example 3

Comparative Sample 3 was prepared using HZSM-5 zeolite instead of P-ZRP zeolite according to the same preparation procedure and quantity of raw materials used for preparing the above sample.

The composition and physical properties of the above two samples are listed in Table 6. The evaluation results of the above samples in the bench-scale fixed-fluidized reactor are listed in Table 7.

The results in Table 7 indicate that the catalyst of the invention exhibits higher $C_2$–$C_4$ olefin yield than that of the catalyst using HZSM-5 as active component by 5%.

TABLE 6

| Catalyst | Sample E | Comparative Sample 3 |
|---|---|---|
| Composition, wt % | | |
| $SiO_2 \cdot Al_2O_3$ | 82.0 | 82.0 |
| zeolite | 18.0 | 18.0 |
| $Na_2O$ | 1.2 | 1.2 |
| $RE_2O_3$ | 0.36 | 0 |
| $P_2O_5$ | 0.9 | 0 |
| Surface area, $m^2/g$ | 251 | 257 |
| Pore volume, ml/g | 0.54 | 0.54 |

TABLE 7

| Catalyst | Sample E | Comparative Sample 3 |
|---|---|---|
| Product yield, wt % | | |
| cracking gas | 55.30 | 49.35 |
| wherein, | | |
| $C_2$ olefin | 6.20 | 3.71 |
| $C_3$ olefin | 18.32 | 15.92 |
| $C_4$ olefin | 13.11 | 12.59 |
| gasoline ($C_5$-221° C.) | 26.50 | 30.71 |
| LCO (221–330° C.) | 7.77 | 8.30 |
| heavy oil (>330° C.) | 3.65 | 4.48 |
| coke | 7.00 | 7.16 |
| Conversion, wt % | 88.58 | 87.22 |
| $C_2$–$C_4$ olefins, wt % | 37.64 | 32.22 |

EXAMPLE 6–9

These examples related to the preparation and cracking performance of the catalyst of the invention using the mixed zeolites of P-ZRP and REY as active component, clay as matrix, and pseudo-boehmite as binder.

Catalyst Samples F, G, H and I were prepared according to the preparation procedure used for preparing catalyst sample C in Examples 3–4, using the mixed zeolites of P-ZRP and REY (a commercial product with a silica/alumina ratio not less than 4.7 and a rare earth oxide content not less than 17%) in different ratio.

Comparative Example 4

Comparative Sample 4 was prepared using the mixed zeolite of REY with HZSM-5 zeolite instead of P-ZRP zeolite.

The composition of the above five samples are listed in Table 8. The results of the evaluation of the above samples in the micro-reactor were listed in Table 9.

The comparison of the data listed in Table 9 for the samples G and Comparative Sample 4, both having same zeolite content, show that the catalyst of the invention is characterised in higher conversion and $C_2$–$C_4$ olefin yield.

TABLE 8

| Catalyst | Sample F | Sample G | Sample H | Sample I | Comparative Sample 4 |
|---|---|---|---|---|---|
| composition, wt % | | | | | |
| clay | 57.4 | 57.4 | 57.4 | 57.4 | 57.4 |
| $Al_2O_3$ | 24.6 | 24.6 | 24.6 | 24.6 | 24.6 |
| P-ZRP | 17.1 | 16.2 | 14.4 | 12.6 | 0 |
| REY | 0.9 | 1.8 | 3.6 | 5.4 | 2.0 |
| HZSM-5 | 0 | 0 | 0 | 0 | 16.0 |

TABLE 9

| Catalyst | Sample F | Sample G | Sample H | Sample I | Comparative Sample 4 |
|---|---|---|---|---|---|
| Activity, wt % | 66 | 72 | 78 | 80 | 55 |
| Gas yield, wt % | 27.74 | 32.28 | 32.99 | 34.83 | 24.67 |
| wherein, | | | | | |
| $C_2$ olefin | 1.33 | 1.42 | 1.52 | 1.47 | 0.86 |
| $C_3$ olefin | 10.66 | 12.11 | 11.56 | 11.13 | 9.25 |
| $C_4$ olefin | 7.74 | 8.76 | 8.05 | 7.60 | 8.04 |
| $C_2$–$C_4$ olefins, wt % | 19.73 | 22.29 | 21.13 | 20.20 | 18.15 |

EXAMPLE 10–13

These examples related to the preparation and cracking performance of the catalyst of the invention using the mixed zeolite of P-ZRP and high silica Y zeolites as active component, clay as matrix, and pseudo-boehmite as binder.

Catalyst Sample J, K, L and M were prepared according to the procedure used for preparing Catalyst Sample C in examples 3–4 using the mixed zeolite of P-ZRP and RSY (commercial name of a high silica Y zeolite prepared by a chemical dealumination method with a silica/alumina ratio of not less than 11) in different ratio.

Comparative Example 5

Comparative Sample 5 was prepared using the mixed zeolite of RSY with HZSM-5 zeolite instead of P-ZRP zeolite.

Table 10 lists the composition of the above five samples. The results of the evaluation of the above samples in the micro-reactor are listed in Table 11.

The comparison of the data in Table 11 for Sample J and Comparative Sample 5, both having same zeolite content, indicate that the catalyst of the invention is characterised in higher conversion and higher $C_2$–$C_4$ olefin yield.

TABLE 10

| Catalyst | Sample J | Sample K | Sample L | Sample M | Comparative Sample 5 |
|---|---|---|---|---|---|
| composition, wt % | | | | | |
| clay | 57.4 | 57.4 | 57.4 | 57.4 | 57.4 |
| $Al_2O_3$ | 24.6 | 24.6 | 24.6 | 24.6 | 24.6 |
| P-ZRP | 17.1 | 16.2 | 14.4 | 12.6 | 0 |
| RSY | 0.9 | 1.8 | 3.6 | 5.4 | 0.9 |
| HZSM-5 | 0 | 0 | 0 | 0 | 17.1 |

TABLE 11

| Catalyst | Sample J | Sample K | Sample L | Sample M | Comparative Sample 5 |
|---|---|---|---|---|---|
| Activity, wt % | 56 43 | 66 | 72 | 78 | 50 |
| Gas yield, wt % wherein, | 26.00 | 30.62 | 32.26 | 34.83 | 22.00 |
| $C_2$ olefin | 1.28 | 1.64 | 1.43 | 1.61 | 0.88 |
| $C_3$ olefin | 9.77 | 12.75 | 11.54 | 11.51 | 8.07 |
| $C_4$ olefin | 7.98 | 9.32 | 8.40 | 7.82 | 7.18 |
| $C_2$–$C_4$ olefins, wt % | 19.03 | 23.71 | 21.37 | 20.94 | 16.13 |

EXAMPLE 14

It related to the preparation and cracking performance of the catalyst of the invention using P-ZRP zeolite as active component, clay as matrix, and pseudo-boehmite and silica sol as binder.

82 kg silica sol (a commercial product with a $SiO_2$ content of 24.49 wt % and a $Na_2O$ content of 0.16 wt %) was diluted with 184 kg de-cationized water, then adding to it 114 kg halloysite, 185 kg pseudo-boehmite, and 12.5 kg hydrochloric acid, stirring homogeneously, ageing for 30 min statically at room temperature and maintaining a pH value of 2–4, further adding to it 36 kg (anhydrous basis) P-ZRP zeolite and 54 kg de-cationized water, homogenising, spray drying, washing, and drying, to obtain Catalyst Sample N.

Comparative Example 6

Comparative Sample 6 was prepared using HZSM-5 zeolite as active component instead of P-ZRP zeolite according to the above example.

The composition and physical properties of the two samples are listed in Table 12. The results of the evaluation of the above two samples in the micro-reactor are listed in Table 13.

The results in Table 13 indicates that the catalyst of the invention is characterised in higher conversion and higher $C_2$–$C_4$ olefin yield.

TABLE 12

| Catalyst | Sample N | Comparative Sample 6 |
|---|---|---|
| Composition, wt % | | |
| clay | 42 | 42 |
| $Al_2O_3$ | 30 | 30 |
| $SiO_2$ | 10 | 10 |
| zeolite | 18 | 18 |
| $Na_2O$ | 0.08 | 0.09 |
| $RE_2O_3$ | 0.36 | 0 |
| $P_2O_5$ | 0.9 | 0 |
| Surface area, $m^2/g$ | 188 | 185 |
| Pore volume, ml/g | 0.24 | 0.23 |

TABLE 13

| Catalyst | Sample N | Comparative Sample 6 |
|---|---|---|
| Activity, wt % | 48 | 41 |
| Gas yield, wt % wherein, | 24.21 | 18.71 |
| $C_2$ olefin | 1.18 | 0.78 |
| $C_3$ olefin | 9.97 | 7.47 |
| $C_4$ olefin | 8.35 | 6.55 |
| $C_2$–$C_4$ olefins, wt % | 19.40 | 14.80 |

EXAMPLE 15

The catalyst of the invention exhibited superior hydrothermal stability.

The fresh samples of the Catalyst Sample C, D, and Comparative Sample 2 were either treated at 800° C. for 4 hrs in the presence of 100% steam, or treated at 800° C. for 17 hrs in the presence of 100% steam. After treatment, the samples were evaluated in the microreactor.

The results are listed in Tables 14, 15, and 16.
In those tables, activity retention % =

$$\frac{\text{activity after hydrothermal treatment}}{\text{activity of the fresh catalyst}} \times 100\%$$

The results in Table 15 indicate that, after a treatment at 800° C. for 4 hrs in the presence of 100% steam, the catalyst of the invention displayed higher activity retention than that of the catalyst using HZSM-5 zeolite as active component by 7–25%. The results in Table 16 further indicate that, after a treatment at 800° C. for 17 hrs in the presence of 100% steam, the catalyst of the invention still displayed higher activity retention than that of the catalyst using HZSM-5 zeolite as active component by 8–14%.

TABLE 14

| Catalyst | Sample C | Sample D | Comparative Sample 2 |
|---|---|---|---|
| Activity, wt % | 57 | 63 | 62 |
| Gas yield, wherein, | 30.30 | 31.63 | 34.32 |
| $C_2$ olefin | 2.88 | 3.16 | 3.84 |
| $C_3$ olefin | 4.37 | 4.71 | 6.47 |
| $C_4$ olefin | 2.37 | 2.36 | 3.13 |

TABLE 14-continued

| Catalyst | Sample C | Sample D | Comparative Sample 2 |
|---|---|---|---|
| $C_2$-$C_4$ olefins, wt % | 9.57 | 10.23 | 13.44 |

TABLE 15

| Catalyst | Sample C | Sample D | Comparative Sample 2 |
|---|---|---|---|
| Activity, wt % | 55 | 49 | 44 |
| Gas yield, wt % | 27.04 | 21.72 | 17.91 |
| wherein, | | | |
| $C_2$ olefin | 1.98 | 1.35 | 0.98 |
| $C_3$ olefin | 10.58 | 8.85 | 7.36 |
| $C_4$ olefin | 7.92 | 6.79 | 5.97 |
| $C_2$-$C_2$ olefins, wt % | 20.48 | 16.99 | 14.21 |
| Activity retention, % | 96 | 78 | 71 |

TABLE 16

| Catalyst | Sample C | Sample D | Comparative Sample 2 |
|---|---|---|---|
| Activity, wt % | 42 | 43 | 37 |
| Gas yield, wt % | 17.43 | 17.73 | 11.72 |
| wherein, | | | |
| $C_2$ olefin | 0.95 | 0.94 | 0.58 |
| $C_3$ olefin | 7.12 | 7.36 | 4.72 |
| $C_4$ olefin | 5.31 | 5.82 | 4.00 |
| $C_2$-$C_4$ olefins, wt % | 13.38 | 14.12 | 9.30 |
| Activity retention, % | 74 | 68 | 60 |

What is claimed is:

1. A cracking catalyst for the production of light olefins comprising 0-70% by weight based on the weight of the catalyst of clay, 5-99% of inorganic oxides and 1-50% of zeolites, wherein said zeolite components comprise 0-25% by weight of Y zeolite and 75-100% by weight of phosphorus and rare earth containing high silica zeolite having a structure of pentasil.

2. A catalyst according to claim 1, wherein said inorganic oxide is selected from $SiO_2.Al_2O_3$, $Al_2O_3$ and $SiO_2$.

3. A catalyst according to claim 1, wherein said Y zeolite is a REY zeolite having a rare earth content of not less than 14% by weight calculated as $RE_2O_3$ and prepared by exchanging a Y zeolite with rare earth cations.

4. A catalyst according to claim 1, wherein said Y zeolite comprises a stabilized high silica Y zeolite prepared by chemical and/or physical treatment.

5. A catalyst according to claim 1, wherein said phosphorus and rare earth containing high silica zeolite having a structure of pentasil comprises a rare earth containing high silica zeolite having a structure of pentasil treated with aluminum phosphate, possessing a phosphorus content of 2-20% by weight calculated as $P_2O_5$.

6. A catalyst according to claim 1, wherein said phosphorus and rare earth containing high silica zeolite having a structure of pentasil comprises a rare earth containing high silica zeolite having a structure of pentasil treated with aluminum phosphate, possessing a phosphorus content of 2-10% by weight calculated as $P_2O_5$.

7. A catalyst according to claim 5, wherein said rare earth containing high silica zeolite having a structure of pentasil possesses an X-ray diffraction pattern of ZSM-5 zeolite family and an anhydrous chemical composition formula: 0.01-0.30 $RE_2O_3$.0.4-1.0 $Na_2O.Al_2O_3$.20-60 $SiO_2$, and a 2-4 times higher adsorption capacity ratio of normal hexane to cyclohexane adsorption than that of ZSM-5 zeolite.

8. A catalyst according to claim 5, wherein said rare earth containing high silica zeolite having a structure of pentasil is prepared by using water glass, aluminum phosphate and inorganic acid as raw materials, and REY and REHY zeolite as crystalline seeds, and crystallizing at 130°-200° C. for 12-60 hrs.

9. A catalyst according to claim 5, wherein said rare earth containing high silica zeolite having a structure of pentasil treated with aluminum phosphate is prepared by pre-exchanging a zeolite with ammonium ion to decrease its sodium content to a level of not more than 0.1% by weight calculated as $Na_2O$, then homogeneously mixing with an aluminum phosphate sol having a composition of $Al_2O_3:P_2O_5=1:1-3$ according to a weight ratio of $P_2O_5$:zeolite, anhydrous basis=1:5-99 and followed by calcining at 300°-600° C. for 0.5-6 hrs in the presence of 10-100% steam.

* * * * *

UNITED STATES PATENT AND TRADEMARK OFFICE
CERTIFICATE OF CORRECTION

PATENT NO. : 5,380,690
DATED : January 10, 1995
INVENTOR(S) : Shi Zhicheng et al.

It is certified that error appears in the above-indentified patent and that said Letters Patent is hereby corrected as shown below:

Title Page, item [73] Assignee: Should read as follows:

China Petro-Chemical Corporation,
Research Institute of Petroleum Processing, SINOPEC,
both of Beijing, China Signed and Sealed this Twenty-second Day of August, 1995

*Attest:*

BRUCE LEHMAN

*Attesting Officer*   Commissioner of Patents and Trademarks